US011216570B2

(12) United States Patent
Prokop et al.

(10) Patent No.: US 11,216,570 B2
(45) Date of Patent: Jan. 4, 2022

(54) REDUCING COMPROMISE OF SENSITIVE DATA IN VIRTUAL MACHINE

(71) Applicant: Visa International Service Association, San Francisco, CA (US)

(72) Inventors: Bartlomiej Prokop, Belfast (GB); James Donaldson, Moira (GB); Peter Lennon, Belfast (GB)

(73) Assignee: Visa International Service Association, San Francisco, CA (US)

( * ) Notice: Subject to any disclaimer, the term of this patent is extended or adjusted under 35 U.S.C. 154(b) by 216 days.

(21) Appl. No.: 16/608,757

(22) PCT Filed: May 18, 2018

(86) PCT No.: PCT/US2018/033452
§ 371 (c)(1),
(2) Date: Oct. 25, 2019

(87) PCT Pub. No.: WO2018/213744
PCT Pub. Date: Nov. 22, 2018

(65) Prior Publication Data

US 2020/0050779 A1    Feb. 13, 2020

Related U.S. Application Data

(60) Provisional application No. 62/508,320, filed on May 18, 2017.

(51) Int. Cl.
*H04L 9/28* (2006.01)
*G06F 21/62* (2013.01)
(Continued)

(52) U.S. Cl.
CPC ........ *G06F 21/6209* (2013.01); *G06F 21/602* (2013.01); *G06F 21/6218* (2013.01);
(Continued)

(58) Field of Classification Search
CPC .............. G06F 21/6209; G06F 21/602; G06F 21/6218; H04L 9/0822; H04L 63/0428
See application file for complete search history.

(56) References Cited

U.S. PATENT DOCUMENTS

2003/0191938 A1* 10/2003 Woods ................ G06F 21/6209
713/165
2010/0125855 A1* 5/2010 Ferwerda .............. G06F 21/445
719/317
(Continued)

FOREIGN PATENT DOCUMENTS

WO        98/43212 A1    10/1998
WO     2011047717        4/2011

OTHER PUBLICATIONS

Extended European Search Report for EP Application No. 18801860.0 dated May 6, 2020, 8 pages.
(Continued)

*Primary Examiner* — Vance M Little
(74) *Attorney, Agent, or Firm* — Kilpatrick Townsend & Stockton LLP

(57) ABSTRACT

Techniques for reducing compromise of sensitive data in a virtual machine are described. During initiation of a secure string instance of a program module in memory allocated to the virtual machine, the program module can receive sensitive data in plaintext and retrieves parameters sourced from outside the allocated memory. During the execution of the program module, the sensitive data can be encrypted using a key based on the parameters to obtain encrypted data. The program module can overwrite the sensitive data with the encrypted data. The program module can receive a trigger to send a message that is generated using the sensitive data. The encrypted data can be decrypted using the key based on the parameters to obtain the sensitive data. After encryption and decryption, the program module can generate the message using the sensitive data and overwrite the sensitive data and the parameters used to encrypt the sensitive data.

20 Claims, 6 Drawing Sheets

(51) Int. Cl.
*G06F 21/60* (2013.01)
*H04L 9/08* (2006.01)
*H04L 29/06* (2006.01)

(52) U.S. Cl.
CPC ........ *H04L 9/0822* (2013.01); *H04L 63/0428* (2013.01); *G06F 2221/2107* (2013.01)

(56) References Cited

U.S. PATENT DOCUMENTS

| | | |
|---|---|---|
| 2010/0257376 A1 | 10/2010 | Little et al. |
| 2012/0036358 A1 | 2/2012 | Johnson et al. |
| 2013/0339252 A1* | 12/2013 | Pauker .................. H04L 9/3226 705/71 |
| 2015/0244710 A1 | 8/2015 | Koster et al. |
| 2015/0244716 A1* | 8/2015 | Potlapally ............... H04L 63/12 713/155 |
| 2017/0004300 A1 | 1/2017 | Pohm |

OTHER PUBLICATIONS

PCT/US2018/033452, "International Search Report and Written Opinion", dated Sep. 7, 2018, 12 pages.

Application No. SG11201909704Q, Further Written Opinion, dated Jul. 5, 2021, 6 pages.

* cited by examiner

REDUCING COMPROMISE OF SENSITIVE DATA IN VIRTUAL MACHINE

CROSS-REFERENCES TO RELATED APPLICATIONS

This application is a 35 U.S.C. 371 patent application which claims priority to PCT Application No. PCT/US2018/033452, with an international filing date of May 18, 2018, which claims the benefit of priority to U.S. Provisional Application No. 62/508,320 filed on May 18, 2017, which are herein incorporated by reference in its entirety for all purposes.

BACKGROUND

An issue that may arise during the development of a software development kit (SDK) is that standard virtual programing languages do not provide the expected protection for sensitive information, especially when an SDK consumer deploys SDK-based software on a potentially vulnerable platform (e.g., public cloud hosting providers or infrastructure as a service). The current state of industry practices when dealing with sensitive information is vulnerable when dealing with storage in the heap. Sensitive information stored in the heap is increasingly vulnerable as a large portion of users are leveraging a public cloud. Sensitive data (such as passwords, social security numbers, credit card numbers, etc.) stored in memory can be leaked if it is stored in an immutable object, such as a managed String object. Sensitive data may remain vulnerable indefinitely if the system performs a memory swap and portions of the heap are stored on the hard drive. The threat posed is that string data may remain in memory long enough to be retrieved by an attacker.

Also, unintentional leaks of sensitive data have occurred several times in recent years, such as Heartbleed in 2014 and most recently Cloudbleed in 2017. As even CPU-based protection becomes exploitable, the protection of sensitive information stored in memory becomes a greater challenge. Memory and CPU exploits raise many concerns related to the security of processing sensitive information on infrastructure that is enclosed in a private data center not fully owned by a user.

For example, in Java, Strings are immutable, managed objects that reside in the heap. For these objects, there is no reliable way to manually evict values from memory. Garbage collection will manage the eviction of these values from memory, but this process is non-deterministic with no guarantees. Garbage collection does not guarantee that memory is overwritten and may simply mark memory as available; thus, sensitive data can remain in memory even after garbage collection. Sensitive information that resides in these objects is therefore at risk of exposure via core dumps, debugging, and confidentiality attacks. The use of virtualized environments and operating system swap files can further compound the problem, resulting in sensitive data residing in memory much longer than required, thus increasing the timeframe during which attacks may occur.

As such, it is recommended not to use string objects for these values in favor of alternative mutable structures such as char[ ] or byte[ ]. However, taking this approach is a trade-off that can have other unintended consequences, such as degraded code quality and increased complexity as the programmer must manually manage the memory through a mutable data structure. Furthermore, a programmer may unintentionally make copies of data, potentially counteracting measures taken. Even using the char/byte arrays does not address the problem fully because crypto libraries or frameworks can create and access copies of memory with sensitive data for internal use. The typical example is in implementations involving Java's standard keyed-hash message authentication code (HMAC). By design, these implementations allow the hasher instance stored in memory to be reused across multiple authentication invocations, resulting in preservation and exposure of the secret key and/or secret key derivatives to CPU and memory exploits for the duration of the instance.

Embodiments of the invention address these and other problems, individually and collectively.

BRIEF SUMMARY

Embodiments described herein are directed to methods in which an encrypted representation of data can be kept in a memory while executing an instance of a program module. The encrypted representation of the data can be stored whenever the data is in memory, i.e., not in use. Storing an encrypted representation of the data and immediately overwriting plaintext values after use can minimize the timeframe during which unencrypted data resides in the memory. The plaintext values may be overwritten immediately after use.

In an embodiment, an encryption key used to encrypt data may also be protected by overwriting the encryption key immediately after use. The encryption key can be derived from information not easily accessible by an attacker through memory inspection, e.g., parameters stored outside of allocated memory. According to embodiments, additional software or hardware components may not be required, such that users can freely use an SDK with the embodiments described herein in an "on premise" and/or "on cloud" model. Embodiments can narrow the opportunity window in which paging to swap memory and/or memory inspection can expose sensitive data to a malicious actor.

These and other embodiments of the invention are described in detail below. For example, other embodiments are directed to systems, devices, and computer readable media associated with methods described herein.

A better understanding of the nature and advantages of embodiments of the present invention may be gained with reference to the following detailed description and the accompanying drawings.

BRIEF DESCRIPTION

TERMS

Figure 1:
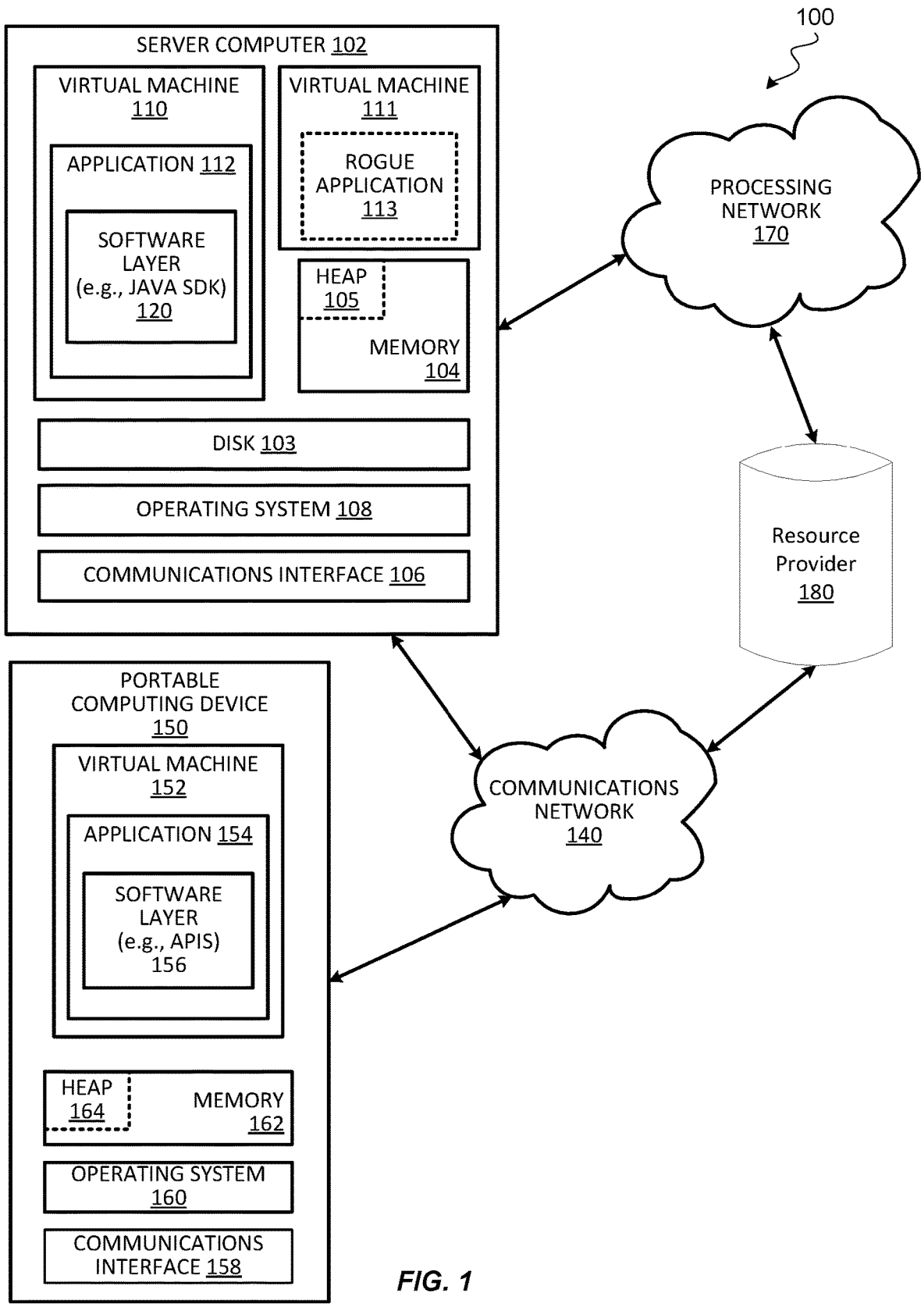
FIG. 1 shows a block diagram of a system for securing sensitive data in network communications according to an embodiment of the invention.

Prior to discussing the details of some embodiments of the present invention, description of some terms may be helpful in understanding the various embodiments.

A "computing device" may be a device that includes one or more electronic components (e.g., an integrated chip). For example, a computing device can include at least one processor coupled to a memory that stores instructions or code for execution by the processor. A "portable computing device" may be a computing device that can be transported and operated by a user, and may include one or more electronic components (e.g., an integrated chip). A portable computing device may provide remote communication capabilities to a network. The portable computing device can be configured to transmit and receive data or communications to and from other devices. A portable computing device may be in the form of a mobile device such as a mobile phone (e.g., smart phone, cellular phone, etc.), tablets, portable media player, personal digital assistant devices (PDAs), wearable device (e.g., watch, health monitoring device such as a fitness tracker, etc.), electronic reader device, etc., or in the form of a card (e.g., smart card) or a fob, etc. Examples of portable computing devices may also include, for example, laptops, netbooks, ultrabooks, etc.

A "server computer" may include a powerful computer or cluster of computers. For example, the server computer can be a large mainframe, a minicomputer cluster, or a group of servers functioning as a unit. In one example, the server computer may be operated by a public cloud hosting providers or infrastructure as a service. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processing network" may include a network that can process and route request messages for resources associated with the processing network. An exemplary processing network may include data processing subsystems, networks, and operations used to support and deliver authorization services, exception file services, transaction scoring services, and clearing and settlement services. An exemplary processing network may include a transaction processing network such as VisaNet™. Transaction processing networks such as VisaNet™ are able to process credit card transactions, debit card transactions, and other types of commercial transactions. VisaNet™, in particular, may include a VIP system (Visa Integrated Payments system) which processes authorization requests and a Base II system which performs clearing and settlement services.

DETAILED DESCRIPTION

Embodiments of the invention are directed to encrypting sensitive data in memory to provide an increased measure of security. Specifically, embodiments are directed to a program module implementation that avoids storing potentially sensitive data in process memory as "plaintext." In embodiments, encryption and controlled access to decrypted data may be employed. The data may be decrypted as required, but may only be kept as an unencrypted value in a memory for a minimal amount of time, and plaintext values may be purged from memory immediately after use.

For example, a symmetric encryption algorithm may use an encryption key that is derived from information that is external to a program module. The encryption key may be derived from information that is static during a program module's lifespan. But, such information (parameters) may change with each new instance of the program module.

In embodiments, an instance of a program module may be used to store sensitive information in unmanaged memory in encrypted format. In one embodiment, constraints such as automatic resource management (ARM) may be additionally used to enforce wiping of plaintext. A resource can include the instance of the program module in memory. ARM can close a resource automatically when the instance completes, whether normally or abruptly and obviates the need for manually closing the instance. Closing the resource can include wiping the plaintext and/or releasing the memory. In another embodiment, try/finally blocks may be used to guarantee faster eviction of sensitive information from memory. A try/finally block can be included in the instructions that cause the processor to wipe the plaintext when the instance completes.

Embodiments can provide a number of technical advantages. Embodiments are more secure than standard Java classes such as String and ByteArray. In contrast with String and ByteArray, embodiments described herein limit the exposure of sensitive data. Furthermore, in embodiments, decryption keys may last for a very short time, and their reconstruction may require access to very large amounts of information about the underlying infrastructure of a program module. Embodiments can serve as a damage mitigation tool by significantly reducing the amount of data that can be exposed in a retroactive attack on a memory snapshot. For example, a malicious actor can obtain copies of an application's memory via data that is written to a swap file and/or data that is read out of a memory from a running server to a different server before its state fails. Where copies of a memory are written to disk, the attack window during which an attack can occur is extended indefinitely, and are thus less secure.

In one embodiment, encryption may be performed using an encryption algorithm and a key. A primary use of encryption may be to obfuscate sensitive information as much as possible when running software in a state that always allows sensitive information to be decrypted and accessed. The key can comprise a combination of values that are easily accessible during a program module's execution. The encryption key may only exist during the lifetime of the program module execution, thus being non-obvious to discover. By using these values (i.e. parameters) in combination, a strong key for encryption may be created. The encryption key may be both trivial to calculate (based on the algorithm chosen) and difficult to recover after the program module's execution has ended or after the key has been discarded (as a result of the parameters used to create the key). In embodiments, a key may be derived from multiple parameters that are external to a program module and available during the lifetime of the program module. In one embodiment, some parameters external to a program module may be sourced from a host operating system (OS) using a management interface and/or fingerprinting techniques. In some embodiments, parameters can be sourced from hardware modules separate from the allocated memory, such as a hard disk, BIOS, a network interface card, etc. According to embodiments, potentially low entropy of information used to derive the key may be avoided. This may help to protect against attacks like memory dumps, inspections, etc.

One use-case for a encrypting sensitive data in memory during an instance may be to help protect shared secrets used to generate API calls to a network, such as a transaction processing network. Embodiments may serve as a revision to standard cryptography frameworks and may provide compatible ciphers and hashers when generating messages. For example, an HMAC hasher can be written from scratch to prevent hasher memory vulnerabilities (i.e. uncontrolled preservation of a secret key and/or secret key derivatives).

I. Sensitive Data Exchange Infrastructure

FIG. 1 shows a block diagram of an exemplary system for securing sensitive data in network communications according to an embodiment of the invention. System 100 can be, for example, a cloud-based system used to conduct secure communications. It should be understood that the systems and methods for reducing compromise of sensitive data in virtual machines described herein can be applied to other types of systems which may or may not be cloud-based.

System 100 includes a server computer 102 (e.g., a cloud-based platform), a communications network 140, a portable computing device 150, and a processing network 170 associated with a resource provider 180. The server computer 102 can include one or more processors, a disk 103, a memory 104, a communications interface 106, and an operating system 108. The disk 103 can include a fixed disk, such as a hard drive, or a removable drive. In some embodiments, the server computer 102 can include a virtual machine 110 configured to run an application 112. The virtual machine 110 can cause the operating system 108 to allocate a portion of memory 104, such as a heap 105, to the virtual machine 110. The memory allocated by the virtual machine 110 can be used for execution of the program module.

The application 112 can include a software layer 120 written in a high level programming language (e.g., Java) and can be implemented as a software development kit (SDK). The software layer 120 can include one or more program modules, such as application programming interfaces (APIs), to implement functions such as user interface functions, networking or communications functions, security sensitive functions, etc. As examples, the program modules can control access to keystores, databases, messaging services, etc. In some embodiments, the APIs can control access to the processing network 170. The software layer 120 can include one or more libraries provided by the resource provider 180 associated with the processing network 170. In some embodiments, the SDK, the APIs, and/or the one or more libraries can support Representational State Transfer (REST) compliant web services.

In some embodiments, the resource provider 180 and/or the server computer 102 can be configured to analyze software layer 120 using static code analysis tools. The static code analysis tools can process the code associated with the software layer to identify portions of the code vulnerable to heap inspection techniques. The resource provider 180 and/or the server computer 102 can transmit instructions that cause the application 112 to replace the vulnerable portions of the software layer with code that reduces the unencrypted storage of plaintext on the heap.

The software layer 120 can include one or more instructions that cause the virtual machine 110 to create one or more instances, such as objects, on the heap 105. In some embodiments, software layer 120 can create an instance of an object in the heap 105 that includes sensitive data received from the portable computing device 150. The server computer 102 can receive data from the communications network 140 and/or the processing network 170 that causes application 112 to generate a message trigger, which can cause the sensitive data to be accessed and used to generate a message sent internally or externally (e.g., sensitive data is sent encrypted). In some embodiments, the message trigger can be initiated by a device, such as the processing network 170 or the portable computing device 150, requesting access to a resource associated with sensitive data on the server computer 102.

In some embodiments, such as a cloud-based platform, the server computer 102 can include a second virtual machine 111. The second virtual machine 111 may be controlled by a malicious actor and include a rogue application 113. The second virtual machine 111, because it is executing on the same server computer 102, can access the memory 104. The rogue application 113 can cause the second virtual machine 111 to access and/or copy portions of memory 104, including portions allocated to the heap 105 associated with virtual machine 110. Portions of the memory 104 and/or the heap 105 can be copied to the disk 103. The accessed and/or copied portions of the heap 105, including any instances with sensitive data created by a program module, can be exploited by the rogue application 113. In some embodiments, the rogue application 113 can access the copies portions of the heap 105 stored on the disk 103 after an instance of the application 112 has terminated.

As explained above, vulnerabilities in a programming environment can be exploited by a malicious actor. For example, standard heap inspection techniques may be used to perform online or offline attacks (e.g. by initiating direct memory access through a privileged process/hypervisor or by analyzing heap dumps/swap files). Even in a secure datacenter, data stored in memory may unintentionally persist in a heap dump and be at risk of exposure to maintenance personnel that access the system. Specific examples of standard inspection techniques may include querying the copied/accessible heap data for arrays of a particular size. For example, a malicious actor can query the copied/accessible heap data for 16 char arrays to identify possible primary account numbers (PANs). The possible PANs can be further filtered by identifying one or more leading digits associated with a bank and/or issuer. For example, a malicious attacker can determine that any 16 char array starting with a '4' may be associated with a PAN issued by VISA. To further filter the 16 char arrays, the malicious attacker can identify 16 char arrays that pass a Luhn check (e.g., to circumvent a number stored as String). Another standard inspection technique includes querying for 64 bytes that end with one or more hex 5C values (e.g., to circumvent HMAC secret keys) because an intermediate step of HMAC can store a partially processed key with hex 5C appended to the partially processed key. An attacker with the partially processed key can generate the same HMAC values as if the original key was used.

The portable computing device 150 can include a virtual machine 152 with an application 154 and a software layer 156, a communications interface 158, an operating system 160, a memory 162, and one or more processors. The portable computing device 150 can be coupled to the server computer 102 via the communications network 140. The virtual machine 152 can cause the operating system 160 to allocate a portion of the memory 162 to a heap 164. The software layer 156 can include one or more program modules, such as APIs provided by the resource provider 180, to send and receive sensitive data.

In some embodiments, the portable computing device 150 may use application 154 to receive user input in the form of sensitive data, such as a password, a social security number, a credit card number, etc. In some embodiments, the user input can cause the sensitive data to be stored temporarily by the software layer 156 in an instance, such as an object, in the heap 164 using the one or more APIs. The data associated with the instance will remain in memory even if the software layer 156 no longer has a reference to the instance. Unless overwritten, the data remains exposed to a rogue application via a memory dump and/or a memory profiler tool. The software layer 156 of the portable computing device 150 can use the one or more APIs to transmit the sensitive data to the server computer 102. In some embodiments, a message trigger can cause the sensitive data to be used to generate a message, where the message trigger can be initiated by a user, internally by the portable computing device 150, or by another device, such as the processing network 170 or server computer 102.

The application 112 on the server computer 102 can process the sensitive data using software layer 120 to verify the information provided by the user. The software layer 120 can transmit the sensitive data to the processing network 170. The processing network 170 can provide sensitive data such as account numbers, account balances, limited use keys, etc. to the server computer 102. The user's portable computing device 150 and the server computer 102 can use encryption algorithms to protect the sensitive data when a program module is still running but the data is in memory and when it is transmitted. In some embodiments, the portable computing device 150 and the server computer 102 may need to store and/or transmit keys used to encrypt and/or decrypt the sensitive data.

II. Protecting Data in the Heap

An operating system can allocate memory available to a virtual machine on a system. Applications executing on a virtual machine, such as the applications described in FIG. 1, can store sensitive data in memory that can be accessed by the operating system and other applications running on the system. To protect this sensitive data, the application can use one or more steps to encrypt sensitive data when it is stored in memory accessible by other applications running on a system.

A. Virtual Machine Memory Allocation

Figure 2:
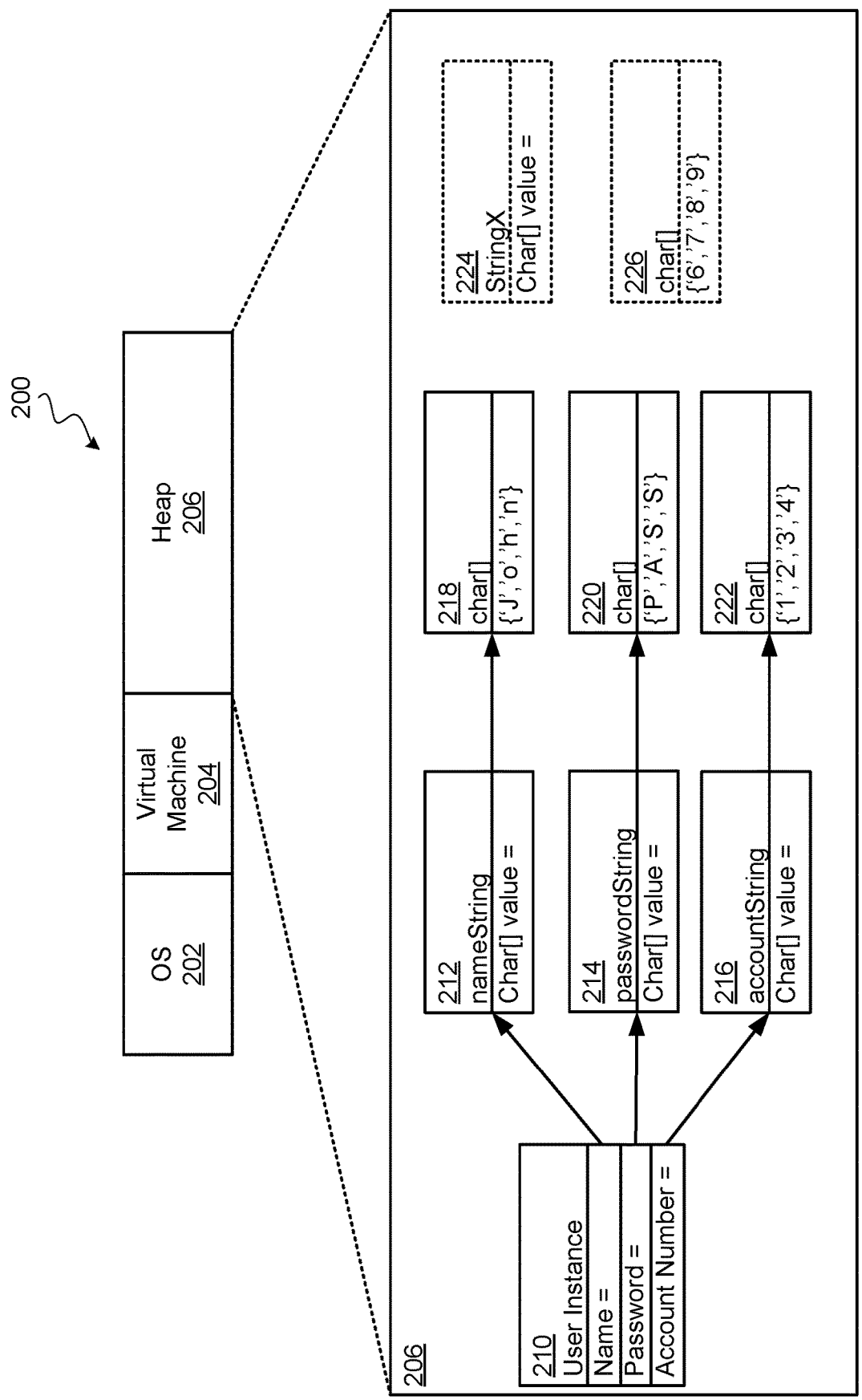
FIG. 2 illustrates the allocation of system memory according to an embodiment of the invention.

FIG. 2 illustrates the allocation of system memory 200 according to an embodiment of the invention. The memory 200 can include, for example, an operating system portion 202, a virtual machine portion 204, and a heap 206. The memory 200 may be an allocated portion of a CPU register, CPU cache, or RAM. The memory allocation can be physical and/or virtual. The memory can be allocated before program execution, i.e., static memory allocation, and/or the memory can be allocated at run time, i.e., dynamic memory allocation.

The heap 206 can be used to store data such as an instance of an object associated with an application executing on a virtual machine. The virtual machine portion 204 can include references to instances of objects stored on the heap 206. In some embodiments, an instance can include a user instance 210 that is associated with an application executing on the virtual machine. The user instance 210 can include reference variables associated with a user's name, password, account number, etc. For example, in Java, these variables can be stored in a managed String object such as nameString 212, passwordString 214, and accountString 216. Each String object may include a reference variable for a character array that stores a value associated with the user. Char[ ] 218 can store the user's name, char[ ] 220 can store the user's password, and char[ ] 222 can store the user's account number. The heap 206 can also include unreferenced objects such as StringX 224 and char[ ] 226. The unreferenced objects will remain exposed in the heap until the data is overwritten.

In some embodiments, both the referenced objects associated with user instance 210 and the unreferenced objects can be accessed by the OS or an application on the virtual machine. Accordingly, sensitive data can be encrypted before it is stored in an object on the heap 206.

B. Data Flow of Instance with Sensitive Data Stored in Heap

As described above, an application running on a virtual machine can receive sensitive data in the form of personally identifiable information, passwords, account numbers, etc. In order to use or process this information, an application may need to store the data in an instance, such as an object, on a heap. The heap can be a portion of memory allocated by an operating system on a computer such as server computer 102 and/or portable computing device 150 shown in FIG. 1. Because the data on the heap can be accessed by the OS and/or other applications, sensitive data in the heap can be protected using encryption.

Figure 3:
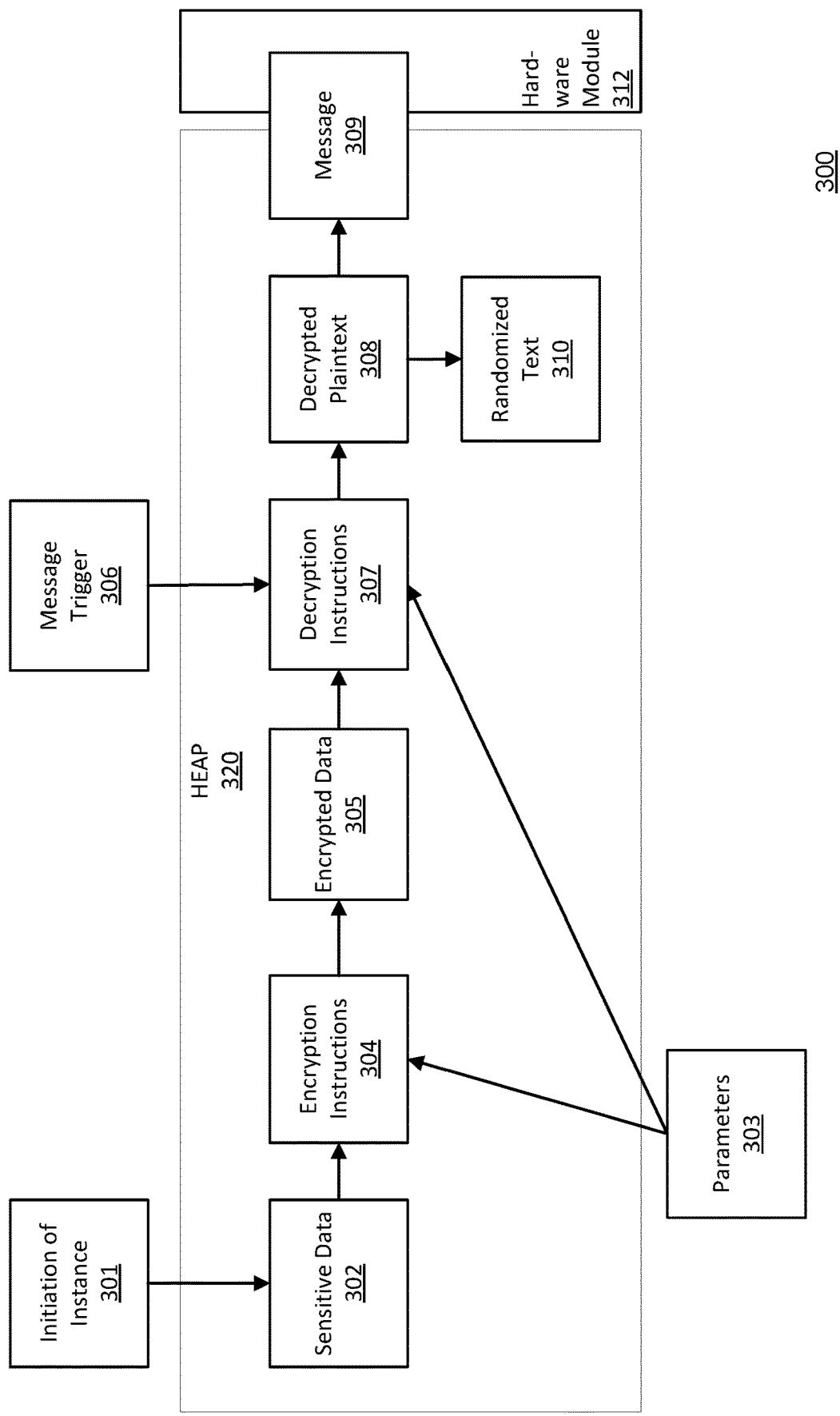
FIG. 3 shows a data flow diagram for securely storing and allowing access to string objects according to an embodiment of the invention.

FIG. 3 shows a data flow diagram for securely storing and allowing access to string objects according to an embodiment of the invention. Data flow 300 may comprise data that is stored in computer memory that may exist inside and outside of a heap of a program module (i.e. inside and outside of heap 320). An example of a program module may include a programming environment or a virtual machine, such as Java Virtual Machine (JVM). Data outside of heap 320 may include instance initiation 301, parameters 303, and message trigger 306. Data inside of heap 320 can be stored, at least for a limited amount of time, and may include sensitive data 302, encryption instructions 304, encrypted data 305, decryption instructions 307, decrypted plaintext 308, message 309, and randomized text 310. The direction of the arrows shown in FIG. 3 show the flow of data in use and processing according to embodiments of the invention.

Heap 320 may be an allocated memory for executing a program module. According to embodiments, sensitive data such as encryption keys, intermediate values used for encryption/decryption, and plaintext values may be immediately discarded/overwritten from heap 320 after each use. For example, decrypted values and parameters used to decrypt the values may be automatically randomized after an instance of the program module has been terminated.

Instance initiation 301 may be a set of instructions for initiating an instance of a program module. For example, instance initiation 301 may be code instructing a processor to initiate an instance of software written in Java or in any other JVM-based language. The software may be, for example, payment processing software or authentication software used by a merchant. In some embodiments, instance initiation 301 may be in response to receiving data and/or an instruction from a remote program module on a user device and/or a transaction processing network.

Sensitive Data 302 may be any sensitive or private data that a user would take steps to protect from unauthorized disclosure. For example, sensitive data 302 may be user credentials (e.g. login credentials, payment credentials, etc.) that a user wishes to keep secret. In embodiments, sensitive data 302 may be data entered by a user as plaintext (clear text) using an input device such as a keyboard, touchscreen, microphone, etc.

Encryption instructions 304 may comprise instructions for encrypting sensitive data 302. For example, encryption instructions 304 may comprise code for an encryption algorithm, in which mathematical operations are used to obfuscate data values, thereby making the original information contained therein unreadable. The encryption algorithm may utilize one or more encryption keys, which may be used as inputs along with plaintext data to form encrypted data 305. In embodiments, the one or more encryption keys may include parameters 303.

Parameters 303 may be parameters that are sourced from outside of heap 320 and available during the lifetime of the program module. In one embodiment, parameters 303 may be parameters about the program module, such as the start time of the program module, process IDs, etc. Parameters 303 may also include parameters about the hardware on which the program module is running on, such as the amount of physical memory, the amount of physical memory space available, parameters from the operating system environment, device derived properties, etc. Device derived properties can include parameters that are sourced from hardware modules separate from the allocated memory, such as a hard disk, BIOS, a network interface card, etc. In addition, parameters 303 may also include a network stack property, such as an IP address or other protocol information.

According to embodiments, parameters 303 may be used to derive an encryption key for encrypting sensitive data in use. For example, twenty different parameters retrieved from various sources outside of heap 320 may be gathered and input into a symmetric key algorithm to encrypt plaintext user credentials. Using parameters 303 can provide a key that only exists for the duration of the instance. Because of the increased security provided by parameters 303 that only exist for the lifetime of an instance, parameters 303 can be used to encrypt/decrypt data stored in other areas of memory. Low entropy parameters can be avoided for parameters 303 to reduce the chances a malicious actor can predict a key during an attack. For example, the amount of physical memory may be associated with low entropy but a process ID may be less predictable and provide a higher entropy parameter. As another example, a MAC address can be associated with a lower entropy than a dynamic IP address. The encryption instructions 304 can include a hashing algorithm and/or key stretching techniques to process the parameters 303 and determine the encryption keys.

Encrypted data 305 hides the original information contained therein. According to embodiments, sensitive information (e.g. user credentials) may be encrypted when stored in memory, such that a hacker may not obtain the sensitive information. For example, copies of string objects or byte arrays may be stored as mutable objects, in which the characters or values of the objects are changed to become meaningless to someone who is able to obtain them. The sensitive data 302 can be overwritten with the encrypted data 305 after the data is encrypted by the encryption instructions 304.

Message trigger 306 may be instructions for a message to be generated in a program module. In one embodiment, message trigger 306 may be a trigger for an API call. For example, the API call may be an API call for performing an authentication process, authorization process, or any other function or service that may be performed based on data stored in the program module. In response to the message trigger 306, the instance of the program module needs to access the sensitive data 302 to generate a message using the sensitive data 302. To access the sensitive data, the instance of the program module can decrypt encrypted data 305.

Decryption instructions 307 may comprise instructions for decrypting encrypted data 305. For example, decryption instructions 307 may comprise code for reversing an encryption algorithm, in which one or more encryption keys in conjunction with mathematical operations are used to unscramble data values of encrypted data 305, thereby making the original information contained therein understandable. According to embodiments, the one or more encryption keys used for decryption may be based on the parameters 303 sourced from outside of heap 320, such as parameters 303. Parameters may be sourced from outside of heap 320 using an OS management interface and/or fingerprinting techniques.

After determining the decrypted plaintext 308, the decrypted plaintext 308 can be used to generate message 309. For example, decrypted plaintext 308 may be user credentials or an authorization key that may be sent in message 309. The message 309 can be encrypted using an asymmetric encryption algorithm with a new key, such as a public key of an intended recipient. The recipient can use a secret key associated with the public key to decrypt the message 309. In some embodiments, the user credentials and/or authorization key can be transmitted for accessing services over a network, such as the communications network and/or the processing network shown in FIG. 1. As shown in FIG. 3, portions of message 309 can be stored outside the heap 320. For example, the program module can write portions of message 309 directly to a separate hardware module 312, such as an I/O submodule that is part of a communications interface.

Message 309 can be generated in heap 320. For example, message 309 may be an API call or a request to access services over a network. In embodiments, message 309 may be generated in a program module using decrypted plaintext 308. The message 309 may be encrypted before transmission to access services over the network. In some embodiments, the message may be transmitted in the same application to a second instance. The second instance may process the sensitive data in a similar manner.

Randomized text 310 may correspond to the plaintext and key that have been overwritten (i.e. erased) in heap 320. In embodiments, plaintext and key values may be overwritten immediately after use by replacing the values in a random manner. For example, decrypted plaintext 308 may be overwritten as randomized text 310 immediately after or simultaneously as message 309 is generated. The overwriting of plaintext and key values may be performed using language constraints, such as automatic resource management and/or try/finally blocks. In this way, the plaintext and key values may only be exposed for a limited amount of time. This may prevent vulnerabilities of a program module to heap inspection techniques and/or heap dump/swap file analysis performed by malicious actors.

In some embodiments, one or more blocks of the data flow 300 can be implemented by code included in an SDK and/or an API. The SDK and/or the API with instructions to execute the data flow 300 can be provided to an application via a communications network.

C. Encryption/Decryption of Sensitive Data Stored in the Heap

Figure 4:
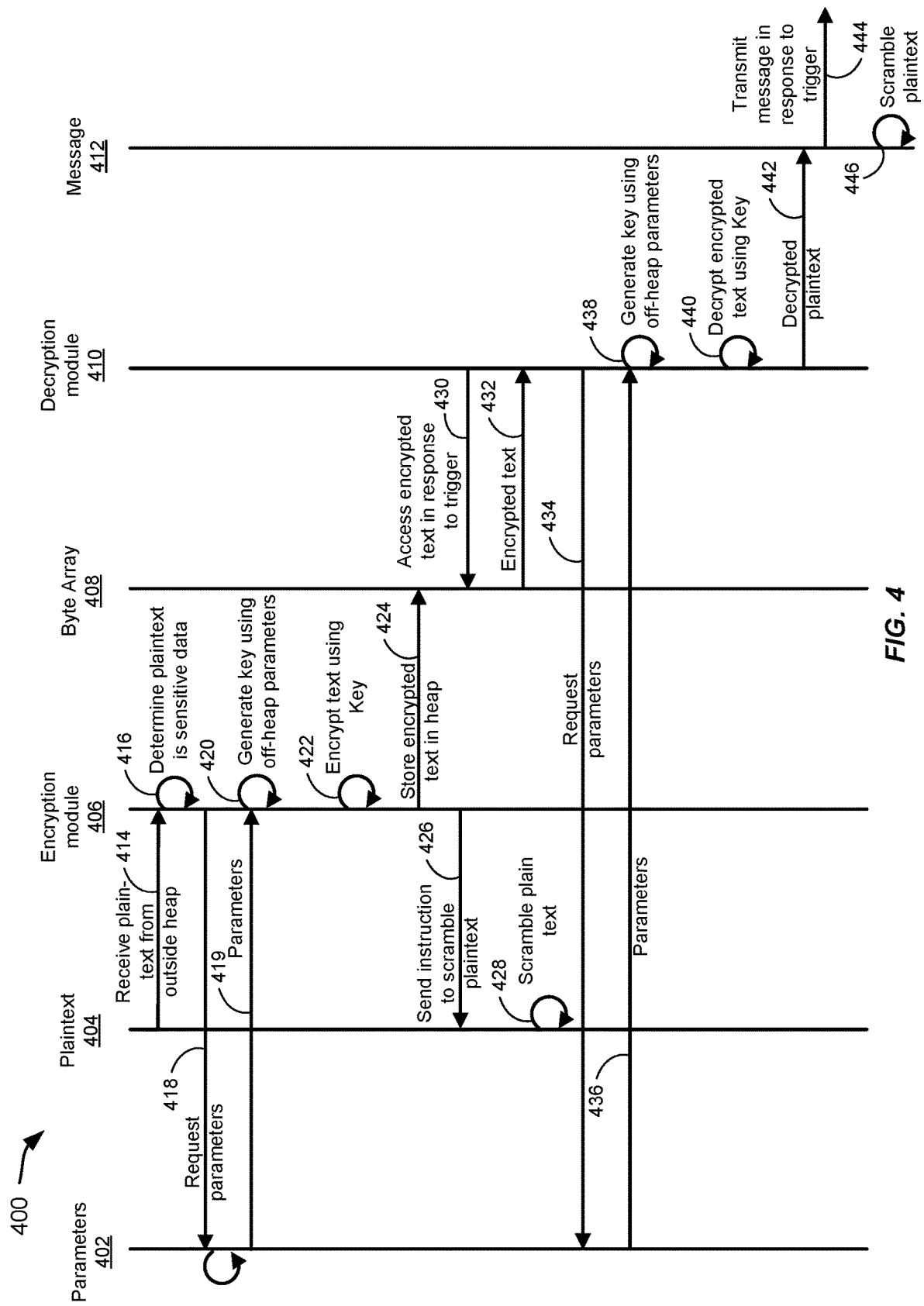
FIG. 4 shows a swim lane diagram illustrating the encryption/decryption process according to an embodiment of the invention.

FIG. 4 shows a swim lane diagram illustrating the encryption/decryption process 400 to minimize the exposure of sensitive data stored as plaintext on the heap. The encryption/decryption process can be a part of a secure string instance of a program module. The process can use one or more modules configured to provide data such as parameters 402 and plaintext 404, an encryption module 406, a byte array 408, decryption module 410, and message 412. In another embodiment, the one or more steps of the encryption/decryption process 400 can be encapsulated behind a simple interfaces, such as an API, to minimize programmer error.

At step 414, in response to the secure string instance initiation, the encryption module 406 can receive plaintext 404 that originated outside the heap. The secure string instance can receive the plaintext from another object instance of the program module, a second application executing on the computer, a server computer, a portable computing device, a processing network, a resource provider, etc.

At step 416, the plaintext can be optionally processed by the encryption module 406 to determine the plaintext includes sensitive data. Such processing can be performed in various ways. For example, the secure string instance can be associated with sensitive data and encrypt all plaintext received. In another example, the encryption module 406 can scan the plaintext to identify char arrays of a particular size, such as 16. In yet another example, the encryption module 406 can scan the plaintext to identify byte strings ending with a particular hex value that is associated with sensitive data. The attack window can be minimized by storing the plaintext ad encrypted sensitive data.

At step 418, the encryption module can request parameters that are available during the lifetime of the program module. Parameters that are available during the lifetime of the program module may be sourced using an OS management interface and/or fingerprinting techniques. Parameters can be sourced from hardware modules separate from the allocated memory, such as a hard disk, BIOS, a network interface card, etc. In some embodiments a plurality of parameters can be sourced. For example, the encryption module can source a first parameter from a first hardware module and a second parameter from a second hardware module, wherein the first hardware module and the second hardware module are separate from the allocated memory.

At step 419, parameters such as an amount of physical memory, process IDs, BIOS serial number, and network stack properties (e.g., IP address, MAC address of network card) can be provided to the encryption module 406. The encryption/decryption process 400 can select parameters that are static during the secure string instance lifespan, but change with each new secure string instance.

At step 420, encryption module 406 can use the parameters to generate a key to use in an encryption algorithm. In some embodiments, the encryption module 406 can use 20 or more parameters to generate the key. To generate a more secure key, the parameters can be processed using key stretching techniques. For example, the parameters can be used as an input to a cryptographic hash function. In some embodiments, the parameters and/or the result of the cryptographic hash function can be used as a seed for a pseudo random number generator to generate the key.

At step 422, the encryption module 406 can use the key and an encryption algorithm to encrypt the plaintext. In some embodiments, the encryption algorithm can implement a block cipher. The encryption module 406 and the decryption module 410 can implement a symmetric cipher. In one embodiment, client-side attack vectors and memory swaps may be limited through the use of symmetric ciphers that operate on 64-bit blocks. The ciphers may further use simple key-scheduling algorithms. Such cipher usage can result in the encryption/decryption routines being compiled into relatively small and compact bytecode and being optimized to be executed on CPU registers, thus avoiding unnecessary RAM usage. In addition, as language constructs are leveraged to enforce wiping (randomizing) plaintext in embodiments, it may be unlikely that memory storing ephemeral plaintext could ever be swapped.

In some embodiments, the symmetric cipher can operate on 64-bit blocks and use a simple key scheduling algorithm. A simple cipher can result in the encryption/decryption routine being compiled into relatively small (192 bytes or less) and compact bytecode. For example, in Java, a Feistel cipher can be implemented using parameters 402 and local variables, both of type int (4 bytes), and returning a single long value (8 bytes). The cipher can be optimized to be executed on CPU registers avoiding unnecessary RAM usage. In some embodiments, the encryption module 406 can further obfuscate the key. The plaintext byte array can be padded to accommodate the block cipher size. A second byte array the same size as the plaintext byte array can be filled with random data and XOR'd with the padded plaintext. The similar sized byte array can be used to condition the key based on the parameters. In some embodiments, an instance counter can be used to obfuscate the key. A different obfuscated key associated with each secure string instance of plaintext limits the exposure of other instances. For example, if a malicious attacker obtains the plaintext and ciphertext from a single secure string instance, only the key for the single secure string instance can be determined, other secure string instances in the same heap remain secure.

At step 424, the encrypted text can be stored in the heap in a mutable structure such as the byte array 408. In some embodiments, the encrypted text can be stored in a character array.

At step 428, the encryption module 406 can overwrite plaintext 404 immediately after being used to create the encrypted. In some embodiments, the key can be overwritten immediately after use by the encryption module 406 to encrypt the plaintext.

The instance of the program module can include a decryption module 410. The decryption module 410 can monitor for a message trigger, such as an API call. As examples, the message trigger can be associated with a second instance of the program module, a second application executing on the computer, a server computer, a portable computing device, a processing network, a resource provider, etc.

At step 430, a message trigger can cause the decryption module 410 to access the encrypted text in the byte array 408. The decryption module 410 can receive the encrypted text at step 432.

At step 434, in response to receiving the encrypted text, the decryption module 410 can request parameters that are available during the lifetime of the program module. Parameters that are available during the lifetime of the program module may be sourced using an OS management interface and/or fingerprinting techniques. Parameters can be sourced from hardware modules separate from the allocated memory, such as a hard disk, BIOS, a network interface card, etc. In some embodiments a plurality of parameters can be sourced. For example, the encryption module can source a first parameter from a first hardware module and a second parameter from a second hardware module, wherein the first hardware module and the second hardware module are separate from the allocated memory.

At step 436, the decryption module 410 can receive one or more parameters. The parameters can be the same parameters received at step 419.

At step 438, the decryption module 410 can generate a key using the same process as the encryption module 406 at step 420 for embodiments using a symmetric cipher. In embodiments using an asymmetric encryption algorithm, the decryption module 410 can determine a private key using one or more parameters 402.

At step 440, the decryption module 410 can use the key to decrypt the encrypted text received from the byte array 408. In some embodiments, the key can be overwritten immediately after use by the decryption module 410 to decrypt the encrypted text.

At step 442, the decrypted text (i.e., plaintext 404 that includes sensitive data) can be used to generate the message 412. The message 412 can be transmitted in response to a message trigger. In some embodiments, the plaintext can be encrypted using a key associated with the message trigger to ensure the sensitive data is encrypted during transmission. In some embodiments, a message trigger can cause the plaintext to be transmitted in the message 412. At step 444, the message 412 can be transmitted in response to receiving a message trigger. The message 412 can be transmitted to a second instance of the program module, a second application executing on the computer, a server computer, a portable computing device, a processing network, a resource provider, etc. The program module can include instructions for transmitting the message to the second instance.

At step 446, the portions of the heap used to store the decrypted plaintext can be overwritten immediately after use. The overwriting of plaintext values may be performed using language constraints, such as automatic resource management. In some embodiments, try/finally blocks may be used to guarantee faster eviction of sensitive information from memory. In some embodiments, one or more steps of the encryption/decryption process 400 can be included in an SDK and/or an API. The SDK and/or the API with the encryption/decryption process 400 can be provided to an application via a communications network.

III. Flow Chart For Protecting Sensitive Data

Figure 5:
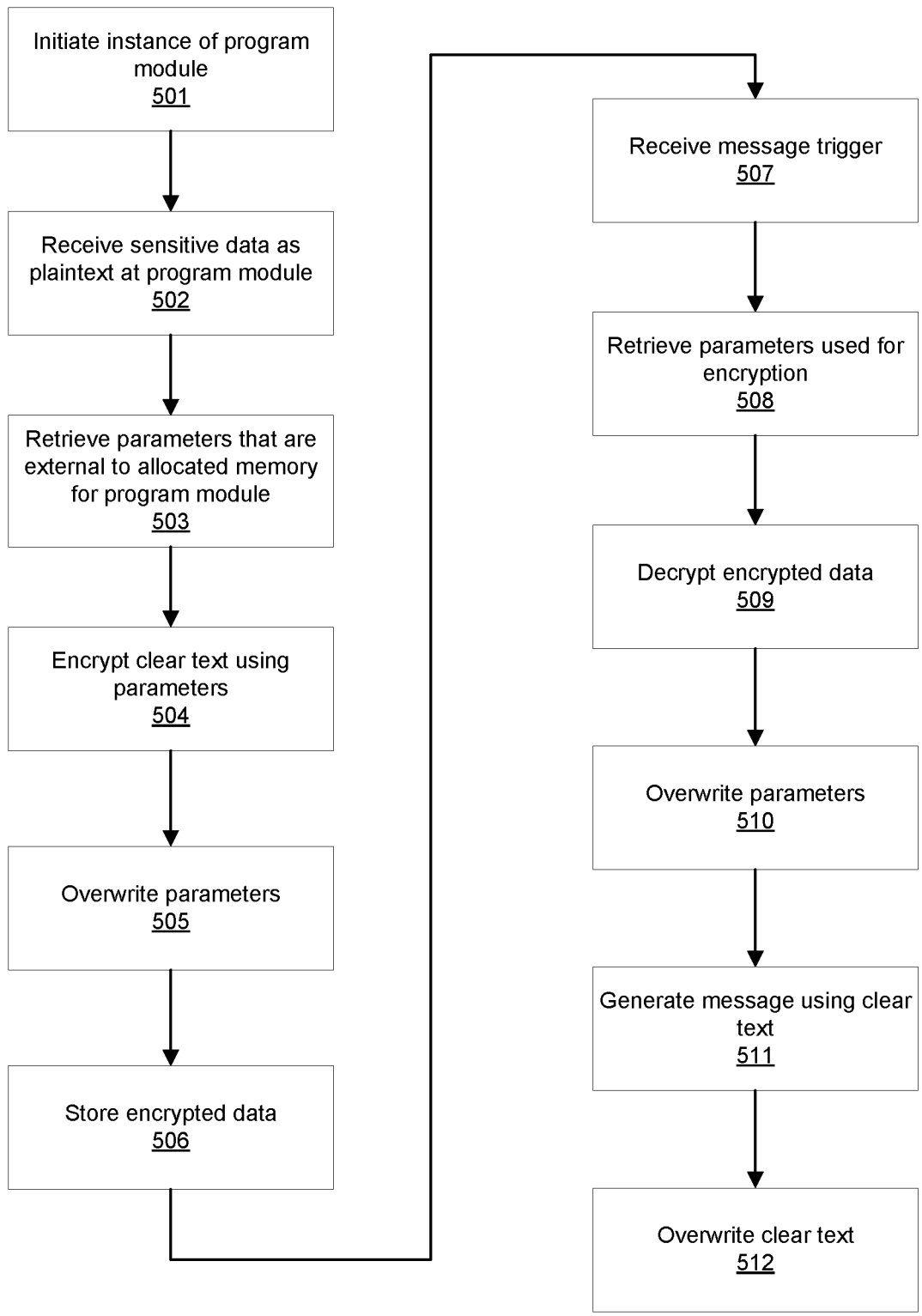
FIG. 5 shows a flow chart of a method for securely storing and allowing access to string-type objects according to an embodiment of the invention.

FIG. 5 shows a flow chart of a method for securely storing and allowing access to string-type objects according to an embodiment of the invention. In embodiments, steps 501 through 512 may be representative of at least data flow 300 of FIG. 3. According to embodiments, steps 501 through 512 may be performed to protect data in use by a program module, by limiting the amount of time during which unencrypted data is stored in the heap of the program module.

At step 501, a secure string instance of a program module may be initiated. The program module may be a programming environment or virtual machine, such as JVM. In one embodiment, the program module may be running on a cloud-based server. The secure string instance may be an object instance of the program module, such as a secure string instance to limit the exposure of sensitive data.

At step 502, sensitive data may be received as plaintext at the secure string instance of the program module. In embodiments, the sensitive data may include user credentials. In one embodiment, the sensitive data may be entered into the secure string instance of the program module by the user using an input device. In another embodiment, the sensitive data may be sent to the secure string instance of the program module from some location outside of the program module, such as from over a network or from some external memory.

At step 503, parameters that are sourced from outside of an allocated memory (i.e. the heap) for executing the program module may be retrieved. In one embodiment, the parameters may be parameters about the program module. The parameters may be retrieved from multiple sources outside of the program module. Examples of parameters outside of the program module may include parameters in the OS environment, the start time of the program module (e.g. Java run time), and any device derived properties. Other examples of parameters outside of the heap may include an amount of physical memory, process IDs, and network stack properties (e.g. IP address). In embodiments, a large number of parameters may be retrieved from outside of the heap to provide greater security (e.g. at least 20 parameters). In embodiments, low entropy parameters can be discarded.

At step 504, the sensitive data represented as plaintext may be encrypted using the retrieved parameters. According to embodiments, a large number of retrieved parameters may be mixed and hashed to derive an encryption key. For example, JVM fingerprinting may be performed to retrieve parameters about a JVM program module, and hash calculation may be performed on the parameters to derive a symmetric encryption key. The encryption key may then be used to encrypt the sensitive plaintext data received at the JVM so as to form a secure string object or secure byte array stored in RAM. In one embodiment, encryption may be performed using a block cipher.

At step 505, the parameters may be overwritten in the heap of the program module. According to embodiments, the encryption key derived from the parameters may be recomposed for every operation and discarded after each use. In this manner, one cannot easily retrieve the encryption key or parameters used to derive the encryption, such as through heap inspection and/or through analysis of swap files, as the encryption key is only obtainable for a limited amount of time during the secure string instance of the program module.

At step 506, the encrypted data may be stored in the heap. In one embodiment, a buffer may be allocated to hold the encrypted value. The buffer may be allocated each time a new instance of a secure string object is created.

At step 507, a trigger to generate a message may be received. In one embodiment, the trigger may be an API trigger for an API call or API request. For example, the API request may be for a login, a save, a query or any other operation to be performed by a server in the name of an application. The application may be provided through an SDK that allows for development in the program module. For example, the application may be a payments processing application that allows a merchant to process payments using code developed in Java.

At step 508, the parameters used for encryption at step 504 may be retrieved upon receiving the trigger to generate the message. The parameters may then be used to re-derive the encryption key so that decryption of the encrypted data may be performed. For example, the parameters may be gathered from outside of the heap and hashed together to form a symmetric encryption key.

At step 509, the encrypted data stored at step 506 may be decrypted using the parameters. For example, data stored in an allocated buffer may be used as an input into a symmetric encryption algorithm along with a key derived from the parameters retrieved at step 508. In one embodiment, the decryption of cipher text may be done only "in place" and may be followed by immediate encryption after use. In embodiments, the exposure of plaintext may be reduced to a minimum and to guarantee that no copies of plaintext are left (e.g. no reusable HMAC hashers used for credentials).

At step 510, the retrieved parameters may be overwritten in the heap. This may be done so as to delete a local copy of the parameters. In this manner, the encryption key cannot be easily obtained by a hacker through heap inspection. In some embodiments, the parameters are not stored in the heap and can be processed using a hash function. A local copy of the output of the hash function may be overwritten in the heap.

At step 511, a message may be generated using the plaintext decrypted at step 509. In other words, the sensitive data received at step 502 may be obtained and used for a period of time. In one embodiment, the sensitive data may be user credentials (e.g. username and password, authorization key, etc.) and the message may be an API request (e.g. for a login or for a request for services).

At step 512, the plaintext may be overwritten in the heap. In one embodiment, this may be done by randomizing the plaintext values. In another embodiment, the overwriting of plaintext may be performed immediately after or during generation of the message. In yet another embodiment, the overwriting of plaintext values may be performed using language constraints, such as automatic resource management. In another embodiment, try/finally blocks may be used to guarantee faster eviction of sensitive information from memory.

As explained above, embodiments of the invention provide a number of technical advantages. Embodiments protect user credentials and other sensitive information, especially in "public cloud" deployment scenarios. Furthermore, embodiments protect against attacks based on memory scans and on memory dumps (i.e. based on analysis of swap files and/or crash heap dumps). According to embodiments, a symmetric encryption key may be derived from information outside of a program module (e.g. via JVM fingerprinting), and the key may be immediately discarded after use. Furthermore, encryption/decryption may be performed "in place." The above features may guarantee that sensitive information is overwritten after each operation, and further do not require re-usable crypto primitives or memory-greedy encryption algorithms.

IV. Computer System

Figure 6:
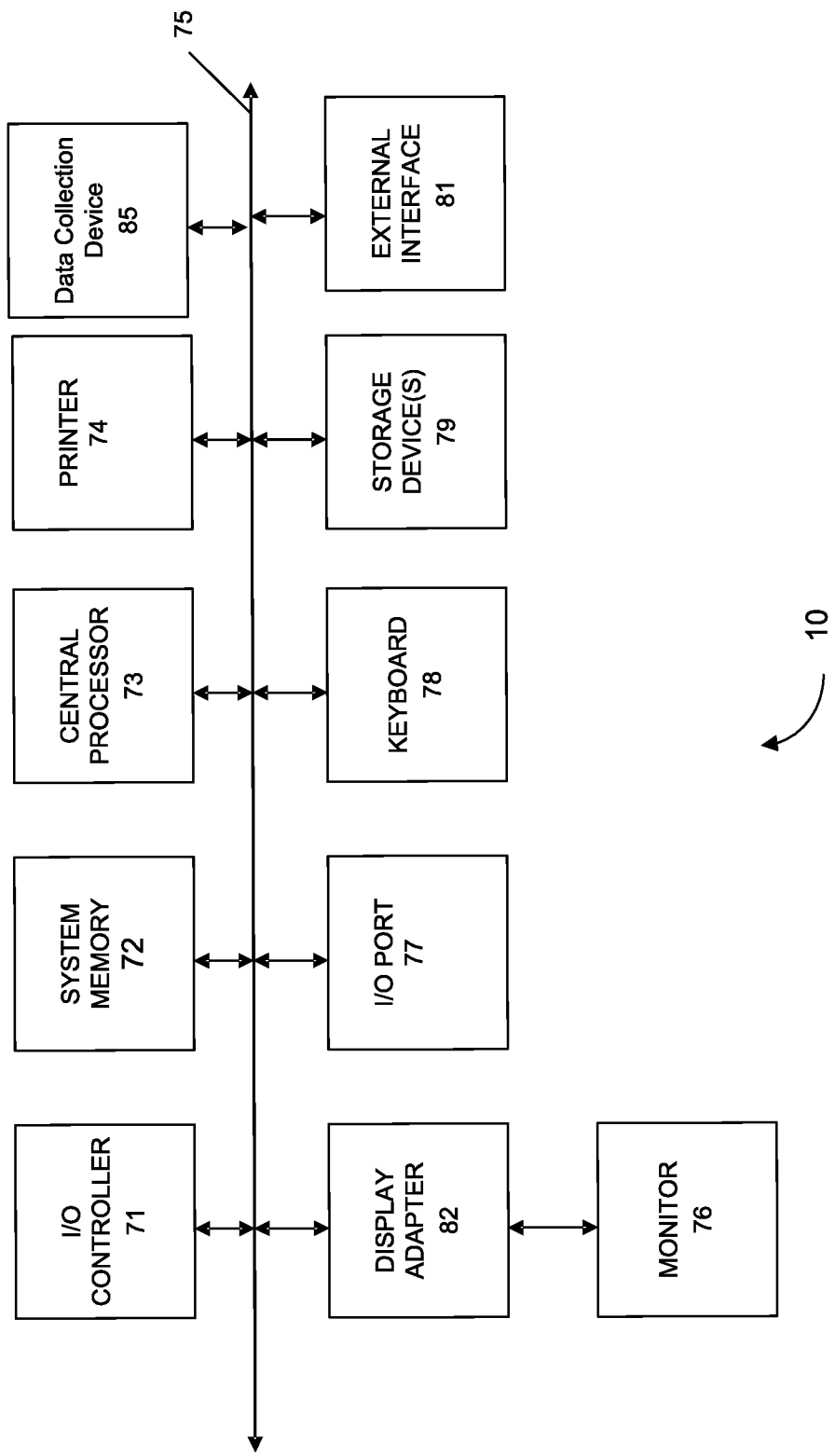
FIG. 6 shows a computer system according to an embodiment of the invention.

Any of the computer systems mentioned herein may utilize any suitable number of subsystems. Examples of such subsystems are shown in FIG. 6 in computer system 10. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 6 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or at different times or in a different order. Additionally, portions of these steps may be used with portions of other steps from other methods. Also, all or portions of a step may be optional. Additionally, any of the steps of any of the methods can be performed with modules, units, circuits, or other means of a system for performing these steps.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

All patents, patent applications, publications, and descriptions mentioned above are herein incorporated by reference in their entirety for all purposes. None is admitted to be prior art.

What is claimed is:

1. A method comprising performing, by a computing device:
    initiating a secure string instance of a program module, wherein the secure string instance is an immutable managed object residing in an allocated memory used for execution of the program module;
    receiving sensitive data at the secure string instance of the program module, the sensitive data being in plaintext;
    retrieving one or more parameters that are sourced from outside of the allocated memory;
    encrypting the sensitive data using the one or more parameters to obtain encrypted data;
    storing the encrypted data;
    receiving a trigger to send a message that is to be generated using the sensitive data;
    retrieving the one or more parameters that are sourced from outside the allocated memory;
    decrypting the encrypted data using the one or more parameters to obtain the sensitive data;
    overwriting the one or more parameters in the allocated memory;
    using the sensitive data to generate the message; and
    overwriting the sensitive data in the allocated memory so as to delete the sensitive data.

2. The method of claim 1, wherein the one or more parameters that are sourced from outside of the allocated memory are associated with the program module.

3. The method of claim 1, further comprising overwriting the one or more parameters in the allocated memory immediately after encrypting the sensitive data.

4. The method of claim 1, wherein the one or more parameters comprises at least one or more of a start time of the program module, a space associated with a physical memory, a process ID, and a network stack property.

5. The method of claim 1, wherein retrieving the one or more parameters comprises:
    retrieving a first parameter from a first hardware module and a second parameter from a second hardware module, wherein the first hardware module and the second hardware module are separate from the allocated memory.

6. The method of claim 1, wherein encrypting the sensitive data further comprises:
    generating a key using the one or more parameters;
    overwriting the one or more parameters in the allocated memory;
    encrypting the sensitive data using the key to obtain the encrypted data; and
    overwriting the key in the allocated memory.

7. The method of claim 6 wherein decrypting the sensitive data further comprises:
    generating the key using the one or more parameters;
    overwriting the one or more parameters in the allocated memory;
    decrypting the sensitive data using the key to obtain the sensitive data; and
    overwriting the key in the allocated memory.

8. The method of claim 1, wherein the trigger is initiated by a device requesting access to a resource associated with the sensitive data.

9. The method of claim 1, wherein using the sensitive data to generate the message further comprises:
    accessing an encryption key associated with the trigger;
    encrypting the sensitive data using the encryption key to obtain encrypted sensitive data; and
    generating the message using the encrypted sensitive data.

10. The method of claim 1 further comprising transmitting the message to a second secure string instance of the program module.

11. The method of claim 1, wherein the message is a request to access services over a network.

12. The method of claim 1, wherein the trigger is associated with an authorization process associated with the sensitive data.

13. The method of claim 1, further comprising:
    storing the sensitive data in a mutable object; and
    overwriting the sensitive data in the mutable object with the encrypted data.

14. A computing device comprising:
    a processor; and
    one or more non-transitory computer readable media storing instructions that, when executed by the processor, cause the computing device to perform:
    initiating a secure string instance of a program module, wherein the secure string instance is an immutable managed object residing in an allocated memory used for execution of the program module;
    receiving sensitive data at the secure string instance of the program module, the sensitive data being in plaintext;
    retrieving one or more parameters that are sourced from outside of the allocated memory;

encrypting the sensitive data using the one or more parameters to obtain encrypted data;

storing the encrypted data;

receiving a trigger to send a message that is to be generated using the sensitive data;

retrieving the one or more parameters that are sourced from outside the allocated memory;

decrypting the encrypted data using the one or more parameters to obtain the sensitive data;

overwriting the one or more parameters in the allocated memory;

using the sensitive data to generate the message; and overwriting the sensitive data in the allocated memory so as to delete the sensitive data.

15. The computing device of claim 14, wherein the one or more parameters comprises at least one or more of a start time of the program module, a space associated with a physical memory, a process ID, and a network stack property.

16. The computing device of claim 14, wherein retrieving the one or more parameters comprises:

retrieving a first parameter from a first hardware module and a second parameter from a second hardware module, wherein the first hardware module and the second hardware module are separate from the allocated memory.

17. The computing device of claim 14, wherein encrypting the sensitive data further comprises:

generating a key using the one or more parameters;

overwriting the one or more parameters in the allocated memory;

encrypting the sensitive data using the key to obtain the encrypted data; and overwriting the key in the allocated memory.

18. The computing device of claim 17, wherein decrypting the sensitive data further comprises:

generating the key using the one or more parameters;

overwriting the one or more parameters in the allocated memory;

decrypting the sensitive data using the key to obtain the sensitive data; and overwriting the key in the allocated memory.

19. The computing device of claim 14, wherein using the sensitive data to generate the message further comprises:

accessing an encryption key associated with the trigger;

encrypting the sensitive data using the encryption key to obtain encrypted sensitive data; and generating the message using the encrypted sensitive data.

20. The computing device of claim 14, wherein the instructions, when executed by the processor, cause the computing device to further perform:

transmitting the message to a second secure string instance of the program module.

* * * * *